United States
Nakamura

[11] 3,923,369
[45] Dec. 2, 1975

[54] RETROFOCUS TYPE OF OBJECTIVE LENS
[75] Inventor: Akiyoshi Nakamura, Sakai, Japan
[73] Assignee: Minolta Camera Kabushiki Kaisha, Osaka, Japan
[22] Filed: Feb. 27, 1974
[21] Appl. No.: 446,545

[30] Foreign Application Priority Data
Feb. 27, 1973   Japan.............................. 48-22712

[52] U.S. Cl.................................. 350/214; 350/255
[51] Int. Cl.²...................... G02B 9/00; G02B 7/02
[58] Field of Search..................... 350/214, 187, 255

[56] References Cited
UNITED STATES PATENTS
3,330,615   7/1967   Price................................... 350/187
3,748,022   7/1973   Tajima............................... 350/214

*Primary Examiner*—Alfred E. Smith
*Assistant Examiner*—Conrad J Clark
*Attorney, Agent, or Firm*—Wolder & Gross

[57]  ABSTRACT

A retrofocus objective lens system has at least two adjoining positive lenses located on the object side, an air spacing which includes a diaphragm and another two adjoining positive lenses located nearest to the image side. The entire lens system is divided into three lens groups (I, II, III) by two air spacings (dA, dB) defined between each two of the two sets of two adjoining positive lenses, whereby the object side first lens group (I) as well as the image side third lens group (III) are moved integrally along an optical axis in cooperation with the focusing operation, while an intermediate second lens group (II) is moved at a speed different from that of the groups (I) and (III), and thereby the air spacings dA and dB are varied so as to compensate for aggravated aberration resulting from focusing to a short distance.

8 Claims, 15 Drawing Figures

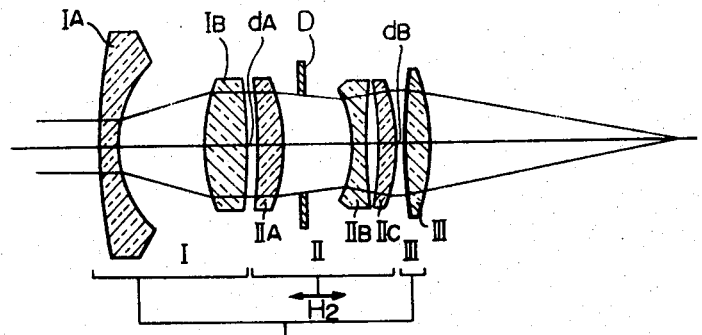
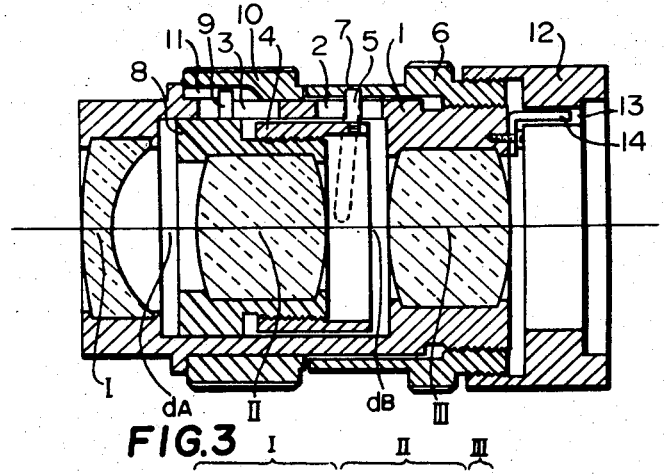
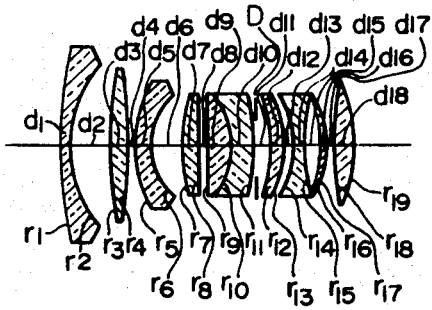

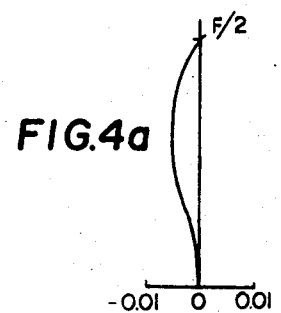
FIG.4a
Spherical aberration
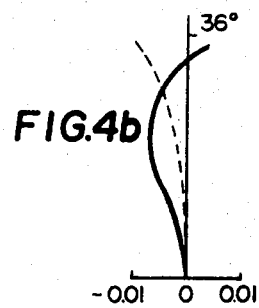
FIG.4b
Astigmatism, field curvature
FIG.4c
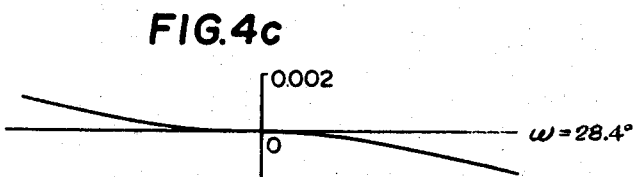
Coma
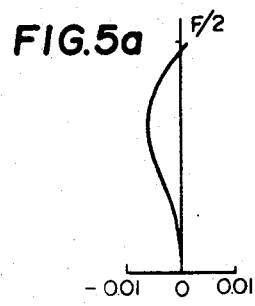
FIG.5a
Spherical aberration
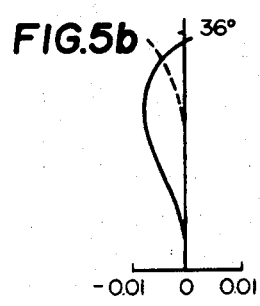
FIG.5b
Astigmatism, field curvature
FIG.5c
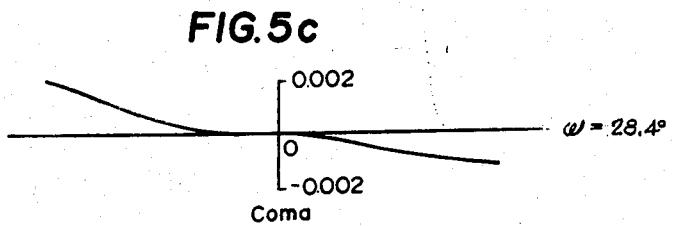
Coma Spherical aberration Astigmatism, field curvature Coma Spherical aberration Astigmatism, field curvature Coma

RETROFOCUS TYPE OF OBJECTIVE LENS

BACKGROUND OF THE INVENTION

The present invention relates generally to a retrofocus type objective lens system for use in a camera, and more particularly to a system of the subject type which possesses improved aberration characteristics when focused to a short distance from said camera.

It is required for a wide angle lens for use in a single lens reflex camera to provide a back-focus having a length which exceeds a given length, even if the focal length of the entire lens system is substantially short, in an attempt to avoid the contact of a movable mirror with the image side surface of the objective lens. It is known that, to this end, a retrofocus type objective lens is used for such an application.

However, the retrofocus type objective lens of this kind has the disadvantage in that the sharpness of an image is impaired in a median zone as well as in the edge portion thereof to thereby fail to provide an excellent image, when the objective lens system is focused on an object positioned at a short distance, because of the arrangement of respective lens which provides non-symetric powers with respect to a diaphragm.

To avoid this disadvantage, there has been proposed an objective lens system, in which one spacing between specific lenses is designed to be variable, such that for focusing on an object positioned at a short distance, the entire lens system is moved a given distance forwards toward the object side, and then the aforesaid spacing is varied in cooperation with such forward movement of the system, thereby preventing an aggravated image, i.e., aggravated field curvature or astigmatism.

Although such an objective lens system enjoys partial success such as in the compensation for aggravated field curvature and astigmatism, the system does not allow for the compensation of aggravated coma to thus produced a coma flare, with an resultant failure to obtain an image of excellent contrast.

In addition, there has been proposed, such as disclosed in Japanese Patent Application laid open under No. 24730/1973, an objective lens system, in which one air spacing in the objective lens system and another air spacing including a diaphragm are arranged to be movable in cooperation with the movement of the lenses for focusing of the entire lens system. However, such an arrangement suffers from the disadvantage that there is a possibility of dust entering the diaphragm device, when adjusting the variable spacing of lenses at the time of assembly and in that the smooth operation of the diaphragm device is possibly impaired.

OBJECTS OF THE INVENTION

It is accordingly an object of the invention to provide a retrofocus type objective lens system which is free of aggravated field curvature and astigmatism and coma, when focused on an object positioned at a short distance.

It is a further object of the invention to provide a retrofocus type objective lens system which permits the maintenance of a constant air spacing including a diaphragm and positioned between lenses, yet provides an image of highly improved contrast over the entire range of image, when focused on an object positioned at a short distance.

It is yet a further object of the invention to provide a retrofocus type objective lens system which has an overall short focal length and a back focus of a length exceeding a given value, such that even when focused to a short distance, there may be obtained an image of highly improved contrast over the entire range thereof, and yet various aberrations may be well compensated.

It is still a further object of the invention to provide a retrofocus type objective lens system, in which an air spacing including a diaphragm is maintained constant, while two air spacings defined between each two of two sets of two adjoining convex lenses which are positioned on the object side of the firstly referred air spacing are designed to vary in cooperation with the axial movement of the entire lens system, thereby providing an adjusting device, by which to prevent an impaired image, when the objective lens system is focused to a short distance.

It is a further object of the invention to provide a retrofocus type lens system and focus adjusting device, in which a photographic object having a certain amount of depth, i.e., parts of which are not positioned in the same plane, may be focused in the same plane in a satisfactory manner by means of an objective lens of a retrofocus type.

The above mentioned and other objects and features of the invention will become apparent from the following detailed description taken in conjunction with the drawings which illustrate embodiments of the invention.

SUMMARY OF THE INVENTION

According to the present invention, there is provided, for attaining the aforesaid objects, a retrofocus type objective lens system, which has at least two adjoining positive lenses located on the object side of an air spacing including a diaphragm and another two adjoining positive lenses located nearest to the image side, and in which the entire lens system is divided into three lens groups (I), (II), (III) by two air spacings (dA, dB) defined between each two of the aforesaid two sets of two adjoining positive lenses, whereby the aforesaid object side first lens group (I) as well as the image side third lens group (III) are moved integrally as a unit along the optical axis in cooperation with the focusing operation, while an intermediate second lens group (II) is moved at a speed different from that of said groups (I) and (III), and whereby the air spacings dA and dB are varied so as to compensate for aggravated aberration resulting from focusing to a short distance from the camera.

The aforesaid first and second variable air spacings include no diaphragm, while the diaphragm is positioned in another air spacing which is maintained contant at all times, thereby preventing the adherance of dust thereto at the time of assembly of this optical system.

The aforesaid first and second variable air spacings dA and dB are positioned in front and in the rear of the aforesaid other air spacing which includes the aforesaid diaphragm. In addition, even if the aforesaid air spacings are varied, when an on-axis pencil of light is substantially in parallel with the optical axis in the aforesaid air spacing, the focal length of the entire lens system, the F-number and the back focus are not affected thereby, while off axis abberration is affected, when the system is focused to a short distance.

It has been discovered in a study of the characteristics of varying air spacings versus kinds of aberrations that there are a variable air spacing dA which functions well to compensate for astigmatism and field curvature without affecting the focal length of the entire lens system, F-number, backfocus and the like, and an air spacing dB which assists in compensating for coma without affecting the aforesaid various other aberrations. One feature of the invention is that those three aberrations resulting from the focusing on an object positioned at a short distance may be compensated for at the same time, by varying the both variable air spacings dA and dB, whereby there may be obtained a retrofocus type objective lens which presents an excellent focusing characteristic, even in an open-diaphragm condition.

The two air spacings dA and dB may be obtained as follows: Assume that the overall focal length of the entire lens system is '$f$', the focal length of the first lens group (I) is '$f_1$' and the focal length of the second lens group (II) is '$f_2$', then, the following relationships should be maintained among the aforesaid '$f$', '$f_1$' and '$f_2$':

$-0.25/f < 1/f_1 < 0.45/f$ ... (a)
$-0.25/f < 1/f_2 < 0.23/f$ ... (b)

Even in the absence of the aforesaid relationships in the objective lens system, it is easy to provide air spacings which meet the aforesaid relationships by splitting lenses in a suitable manner. Accordingly, it is another feature of the present invention that the system of the invention may be applied to any kind of retrofocus type objective lens system.

BRIEF DESCRIPTION OF THE DRAWINGS

FIG. 1 is a medial longitudinal sectional view showing the principle of the retrofocus type objective lens system according to the present invention;

FIG. 2 is a longitudinal cross-sectional view of one embodiment of a lens mount of an objective lens system according to the present invention;

FIG. 3 is a medial longitudinal sectional view of one embodiment of an objective lens system of the invention;

FIG. 4 are plots showing aberration curves when focused on an infinite point in the above embodiment, in which FIG. 4A illustrates the spherical aberration, FIG. 4B illustrates the astigmatism and field curvature and FIG. 4C illustrates the coma;

FIG. 5 are plots showing aberration curves when focused to a short distance at a magnification of 0.139, with the first and second variable spacings being varied in the above embodiment, in which FIG. 5A illustrates the spherical aberration, FIG. 5B illustrates the astigmatism and field curvature, and FIG. 5C illustrates the coma;

FIG. 6 are plots showing aberrations curves, when focused from an infinite point to a short distance, at the magnification of 0.139 without varying the first and second variable air spacings, in which FIG. 7 are plots showing aberration curves, when focused from an infinite point to a short distance at the magnification of 0.139, without varying the second variable air spacings in the above embodiment, in which

DETAILED DESCRIPTION OF THE INVENTION

Figure 6A:
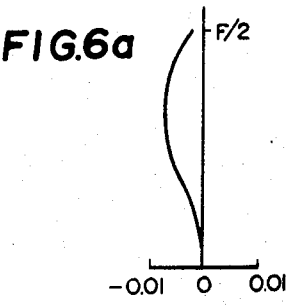
FIG. 6A illustrates the spherical aberration.

FIG. 1 illustrates by diagram the fundamental arrangement of a retrofocus type objective lens according to the present invention, in which there are provided a first air spacing dA between the two positive lenses located on the object side, another air spacing in which is located a diaphragm D and a second air spacing dB between the positive lens III located nearest to the image and the positive lens IIC adjoining thereto but located on its object side. The entire retrofocus lens system is divided by the aforesaid first and second air spacings dA and dB into a first or front lens group (I) consisting of a negative lens (IA) and a positive lens (IB) arranged in order from the front or object, respectively, a second or intermediate lens group (II) consisting successively from the front of a positive lens (IIA), a negative lens (IIB) and a positive lens (IIC), and a third or rear lens group (III) consisting of a single positive lens III, the spacings among the aforesaid lens groups being maintained constant.

Assume the focal length of the entire lens system of the aforesaid retrofocus type being '$f$', the focal length of the first lens group (I) being '$f_1$' and the focal length of the second lens group being '$f_2$', if the following relationships are maintained:

$-0.25/f < 1/f_1 < 0.45/f$ ... (a)
$-0.25/f < 1/f_2 < 0.23/f$ ... (b)

then the focal length, F number, back focus and the like of the entire lens system may be maintained constant, even if the air spacings dA and dB are varied.

When these lenses are moved along the optical axis for focusing, the first lens group (I) and the third lens group (III) are moved integrally as a unit, while the second lens group (II) is moved at a speed different from that of the groups (I) and (III) in cooperation with the movements of lens groups (I) and (III), whereby the first air spacing dA and second air spacing dB are varied, such that the field curvature and astigmatism, resulting when focused to a short distance, are compensated for by the first variable air spacing dA and the coma is compensated for by the second air spacing dB, respectively.

The aforesaid requirements (a) is for the first variable air spacing dA to effectively compensate for the positive deflection of astigmatism and field curvature, which are produced when the entire lens system is focused to a short distance. When the upper limit is exceeded, there will result poor convergency for the light from an object point on the axis, when said light is emitted from the first lens group, the result being a greater variation in distortion and chromatic aberration, when the first variable air spacing dA is varied. On the other hand, when the lower limit is exceeded and the light from an object point on the axis is emitted from the first lens group (I), there will result poor divergency, such that the variation of coma becomes larger in its range with the variation in the first variable air spacing dA, while the outwardly oriented coma will be increased which is produced by the focusing of the entire lens group to a short distance. Furthermore, even when either the upper or lower limit is exceeded, the focal length or backfocus of the entire lens system will be varied, due to variations in both variable air spacings dA and dB, with the attendant greater variation in the spherical abberation. In addition, compensation for astigmatism and field curvature cannot be effectively achieved.

The aforesaid requirements (b) is for the second variable air spacing dB to effectively compensate for the outward orientation of coma which is produced when the entire lens system is focused to a short distance. When the upper limit thereof is exceeded, there will result poor convergency for the light, when the light from an object point on the axis is emitted from the second lens group (II), while there will result greater variation in astigmatism, whereby compensation for astigmatism by varying the first variable air spacing dA is hindered. On the other hand, when the lower limit is exceeded, there will result poor divergency for the light, when the light is emitted from the second lens group (II), while there will result greater variation in astigmatism and chromatic aberration. Furthermore, even when either the upper or lower limits is exceeded, the focal length or backfocus of the entire lens system will be varied due to variations in both variable air spacings dA and dB, with attendant greater influence on spherical aberration.

In other words, the aforesaid requirements (a) and (b) are for an on-axial pencil of light passing through both variable air spacings dA and dB to run substantially in parallel with an optical axis, and are numerically represented by using the focal length '$f$' of the entire lens system, the focal length '$f_1$' of the first lens group and the focal length '$f_2$' of the second lens group.

The aforesaid description refers to the case where the retrofocus lenses according to the present invention provides a sharp focus on a film perpendicular to the optical axis for the image of an object which is spaced at a given distance and located in a plane perpendicular to the optical axis, as in the case with the conventional photographic lenses. The aforesaid description further refers to a solution to this problem i.e., whereby to move the second lens group (II) at a speed different from that of the first and third lens groups (I) and (III) in cooperation with the integral movement of the first and third lens groups (I) and (III). However, in general, it is quite often desirable to take a picture of an object which is three-dimensional in shape, i.e., which has some degree of depth. In such a case, the objective lens system which is particularly directed to providing adaptability to photographing a two-dimensional photographic object, is not always recommendable.

For instance, in the case where the subject or main object is placed in the center of a scene and a subsidiary object is placed at the opposite edges or at one of the edges of the scene at a close or remote distance from a camera, and yet in case where the distance of the subject object from the subsidiary object exceeds the object depth of an objective lens, the aforesaid objective lens system which affords excellent delineating characteristic for the two-dimensional object fails to give a good picture. Rather, it is preferable that positive or negative field curvature remain in the objective lens. Thus, a sharp image may be obtained for the subject and subsidiary objects by varying field curvature in a suitable manner.

The retrofocus type objective lens system and the focus adjusting device of the present invention may vary the image characteristics of the objective lens which is adapted to effect the photographing of a scene as aforementioned. To this end, in addition to, but separately from the arrangement for focusing, wherein the second lens group (II) is moved at a speed different from that of the first and third lens groups (I) and (III) in cooperation with the movements of the first and third lens groups, there is provided an image characteristic adjusting mechanism wherein the second lens group (II) alone may be moved relative to the first and third lens groups (I) and (III), thereby achieving a desired image characteristic.

Stated in more detail, according to the focus adjusting mechanism, the first lens group (I) and the third lens group (III) are moved relative to the subject object, while the second lens group (II) is moved at a speed different from that of the first and third lens groups in cooperation with the movements thereof, after which, according to the image characteristic adjusting mechanism the second lens group (II) alone is moved slightly, thereby varying the first variable air spacing dA and second variable air spacing dB for producing a certain degree of field curvature, with the result that both the subject object and the subsidiary object may be focused satisfactorily.

FIG. 2 shows a longitudinal cross-sectional view of a lens mount adapted to effect the aforesaid movements for the respective lens groups, in which mount the respective lenses shown in FIG. 1 are incorporated, with those lens groups being shown diagrammatically.

The lens mount has a first inner cylinder or barrel 1 firmly holding the first lens group (I) and third lens group (III), while the first inner cylinder 1 is formed with a linear groove 2 extending parallel to the optical axis and with an opening 3 of a wide peripheral shape. A second inner cylinder 4 is slideable along the optical axis in the first inner cylinder 1, said inner cylinder 4 having a first radially extending operating pin 5 projecting through and slideably engaging linear groove 2.

Formed in the inner peripheral surface of an adjusting ring 6 which has a female thread engaging a thread formed in the outer peripheral surface of the first inner cylinder 1 is a helically extending lead groove 7 which is slideably engaged by the tip portion of the aforesaid operating pin 5.

A guide pin 14 projecting in a direction of the optical axis is fitted into a guide groove 13 in a fixed lens mount 12 having a female thread engaging a thread in the outer peripheral surface of the adjusting ring 6. The threading engagement of the fixed lens mount 12 with adjusting ring 6 as well as the threading engagement of the first inner cylinder with adjusting ring 6 define a first helicoid mechanism $H_1$, whereby the rotation of adjusting ring 6 relative to fixed lens mount 12 causes the first inner cylinder 1 to move along the direction of the optical axis, which inner cylinder 1 is not rotatable relative to fixed lens mount 12, whereby the first lens group (I) and third lens group (III) are moved in the direction of the optical axis, and then the first operating pin 5 moves in a direction of the optical axis by means of lead groove 7 and linear groove 2, thereby causing second inner cylinder 4 to move in the direction of the optical axis.

The third inner cylinder 8 in threading engagement with the second inner cylinder 4 and second helicoid mechanism $H_2$ holds the second lens group (II) and is provided with the second operating pin 9 projecting in a radial direction. The second operating pin 9 projects through wide opening 3 in the first inner cylinder 1.

Provided around the outer peripheral surface of the first inner cylinder 1 is an operating ring 10 which is rotatable relative to the first inner cylinder 1, but in front of adjusting ring 6, while the tip portion of the second operating pin 9 slideably engages a linear groove 11 formed in the inner peripheral surface of operating ring 10 parallel to the optical axis.

With the above described mechanism, the rotation of adjusting ring 6 causes the first inner cylinder 1 to move without rotation, along the optical axis with the aid of the first helicoid mechanism $H_1$, whereby the first lens group (I) and the third lens group (III) are moved, while the second inner cylinder 4 is moved without rotation, along the optical axis by the cooperation of lead groove 7 and linear groove 2, at a speed different from that of the first and third lens groups. In addition, the third inner cylinder 8 and second lens group (II) are moved in the direction of the optical axis to thereby effect focusing to a specific distance. Meanwhile, second pin 9 is free to move within linear groove 11 and opening 3. Accordingly, adjusting ring 6, first helicoid mechanism $H_1$, guide pin 14, guide groove 13, lead guide 7, first operating pin 5 and linear groove 11 serve as mechanism for focusing.

In contrast thereto, when operating ring 10 is rotated after focusing to a specific distance, linear groove 11 rotates second operating pin 9 in engagement therewith, thereby rotating the third inner cylinder 8 relative to the second inner cylinder 4, such that the third inner cylinder 8 alone moves in the direction of the optical axis by means of the second helicoid mechanism $H_2$ while the second lens group alone is moved toward the first lens group (I) and third lens group (III). This causes variation in the first variable air spacing dA and second variable air spacing dB, whereby the image characteristics of the entire lens system may be varied.

FIG. 3 illustrates one specific embodiment of a retrofocus type objective lens system according to the present invention. The entire lens system consists of 10 lenses, has an F number of 2, an angle of view $2\omega$ of being 72° backfocus 1.31 times the focal length of the entire lens system. The first lens group (I) consists, from the object side, of the first lens to the fourth lens, and the second lens group (II) consists of the fifth lens to the ninth lens, with a diaphragm D being positioned in the air spacing $d_{11}$ between the sixth lens and the seventh lens. The third lens group consist of the tenth lens. Accordingly, the first variable air spacing dA is air spacing $d_8$ between the fourth positive lens and the fifth positive lens, while the second variable air spacing dB is air spacing $d_{17}$ between the ninth positive lens and the 10th positive lens.

The following table sets forth the specific parameters of the lens system of FIG. 3, the focal length 'f' of the entire system being 1:

| f=1 radius of curvature | f number=2 axial dimension | angle of view $2\omega$ 72° refractive index | backfocus s'=1.31 Abbe's number |
|---|---|---|---|
| $r_1 = 3.7193$ | | | |
| | $d_1 = 0.0972$ | $N_1 = 1.6$ | $v_d = 64.1$ |
| $r_2 = 0.9414$ | | | |
| | $d_2 = 0.2754$ | | |
| $r_3 = 2.7507$ | | | |
| | $d_3 = 0.1441$ | $N_2 = 1.6727$ | $v_d = 32.2$ |
| $r_4 = -6.7893$ | | | |
| | $d_4 = 0.07$ | | |
| $r_5 = 0.9556$ | | | |
| | $d_5 = 0.0959$ | $N_3 = 1.6660$ | $v_d = 47.9$ |
| $r_6 = 0.494$ | | | |
| | $d_6 = 0.3309$ | | |
| $r_7 = 1.1975$ | | | |
| | $d_7 = 0.05872$ | $N_4 = 1.72$ | $v_d = 50.3$ |
| $r_8 = 4.8112$ | | | |
| | $d_8 = 0.0560$ | | |
| $r_9 = 12.8403$ | | | |
| | $d_9 = 0.2003$ | $N_5 = 1.72$ | $v_d = 50.3$ |
| $r_{10} = -0.5629$ | | | |
| | $d_{10} = 0.1612$ | $N_6 = 1.5569$ | $v_d = 48.5$ |
| $r_{11} = -2.1787$ | | | |

-continued

| f=1 radius of curvature | f number=2 axial dimension | angle of view $2\omega$ 72° refractive index | backfocus s'=1.31 Abbe's number |
|---|---|---|---|
| | $d_{11} = 0.1164$ | | |
| $r_{12} = -1.3579$ | | | |
| | $d_{12} = 0.1097$ | $N_7 = 1.62$ | $v_d = 36.3$ |
| $r_{13} = -0.8693$ | | | |
| | $d_{13} = 0.0861$ | | |
| $r_{14} = -0.7301$ | | | |
| | $d_{14} = 0.1064$ | $N_8 = 1.8051$ | $v_d = 25.4$ |
| $r_{15} = 2.3288$ | | | |
| | $d_{15} = 0.0855$ | | |
| $r_{16} = -1.427$ | | | |
| | $d_{16} = 0.1007$ | $N_9 = 1.757$ | $v_d = 47.9$ |
| $r_{17} = -0.7319$ | | | |
| | $d_{17} = 0.0067$ | | |
| $r_{18} = 3.6906$ | | | |
| | $d_{18} = 0.18$ | $N_{10} = 1.705$ | $v_d = 54.8$ |
| $r_{19} = -1.2175$ | | | |
| | $\Sigma d = 2.2811$ | | |

Assume the focal lengths of the first lens group (I) and the second lens group (II) being $f_1$ and $f_2$ respectively, then $1/f_1 = -0.16$ and $1/f_2 = 0.11$. These formulae meet the aforesaid requirements (a) and (b).

FIG. 4 shows aberration curves, when focused to an infinite point. FIG. 4A illustrates the spherical aberration, FIG. 4B illustrates the field curvature and astigmatism, and FIG. 4C shows the coma when the height of image is 70 percent the maximum image height. FIG. 5 shows aberration curves when focused to the magnification of 0.139, with the first and second variable spacings being varied, in which air spacing $d_8$ forming the first variable air spacing dA is adjusted to 0.033, while air spacing $d_{17}$ forming the second variable air spacing dB is adjusted to 0.030.

Figure 6B:
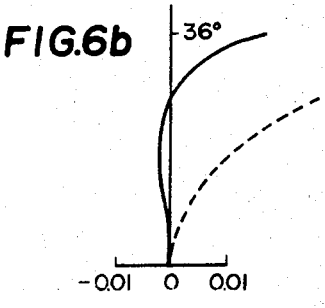
FIG. 6B illustrates astigmatism and field curvature and FIG. 6C illustrates the coma.
Figure 6C:
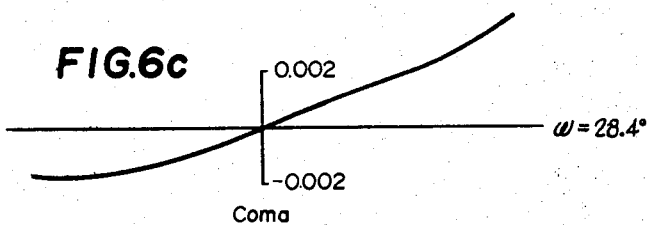
Figure 7A:
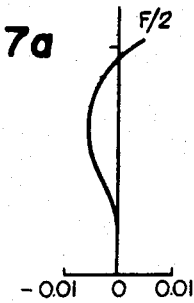
FIG. 7A illustrates the spherical aberration.

FIG. 6 illustrates the aberration curves, when the entire lens system is moved forwards from infinite focusing to a magnification of 0.139. FIG. 7 illustrates the case where infinite focusing as shown in FIG. 5 is changed to the focusing at a magnification of 0.139, with the first variable air spacing $d_8$ alone being varied. In this respect, the first variable air spacing $d_8$ is adjusted to 0.032.

Figure 7B:
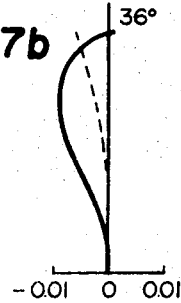
FIG. 7B illustrates the astigmatism and field of curvature and FIG. 7C illustrates the coma.
Figure 7C:
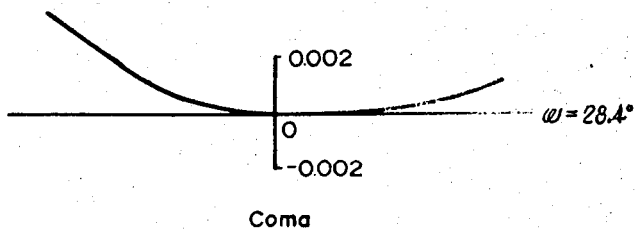

As can be seen from the aforesaid aberration curves, when the aberration which has been compensated for to an infinite point is changed to a short-distance focusing, with the entire lens system alone being moved forward, then there will result aggravated astigmatism and field curvature due to their positive deflection, as shown in FIG. 6, while the coma suffers from its increased outward orientation. In contrast thereto, astigmatism and field curvature may be materially improved as shown in FIG. 7B by varying the first variable air spacing dA. However, as shown in FIG. 7C, the outward orientation of coma is not improved to any degree. Nevertheless, according to the present invention, when the first and second air spacings dA and dB are varied, the outward orientation of coma may be compensated for completely.

The present invention is not limited to the objective lens system as shown in FIG. 3, nor to the lens mount exemplified in FIG. 2.

It will be understood that the above description is merely illustrative of preferred embodiments of the invention. Additional modifications and improvements utilizing the discoveries of the present invention can be readily anticipated by those skilled in the art from the present discoveries, and such modification and improvements may fairly be presumed to be within the scope of the purview of the invention as defined by the claims that follow.

I claim:

1. A retrofocus objective lens comprising a front lens group including a rear positive lens, a rear lens group including a rearmost lens, an intermediate lens group disposed between and axially spaced from said front and rear lens groups including a front positive lens delineating with said front lens group rear positive lens, a first intergroup air space, and a rear positive lens delineating with said rear group rearmost positive lens a second intergroup air space, said intermediate lens group further including a diaphragm disposed at the back of said front lens of the intermediate lens group, the distance between said front and rear lens groups being fixed, and means for concurrently axially moving said front and rear lens groups as a unit and said intermediate lens group at a rate different from that of said front and rear lens groups to thereby vary the axial dimensions of said intergroup air spaces and compensate for the aggravation of aberration attendant to changes in the focus of said objective lens.

2. A retrofocus type objective lens system as set forth in claim 1, wherein said system consists of 10 lenses as shown by following table in which the focal length "$f$" of the entire system is 1, said first air space being that defined between a fourth positive lens and a fifth positive lens, said second air space being that defined between a ninth positive lens and a 10th positive lens, relative aperture being F/2.0, angle of view being 72° and backfocus being 1.31f ($f$: focal length):

| radius of curvature | on-axial thickness | refractive index | Abbe's number |
|---|---|---|---|
| $r_1 = 3.7193$ | | | |
| | $d_1 = 0.0972$ | $N_1 = 1.6$ | $v_d = 64.1$ |
| $r_2 = 0.9414$ | | | |
| | $d_2 = 0.2754$ | | |
| $r_3 = 2.7507$ | | | |
| | $d_3 = 0.1441$ | $N_2 = 1.6727$ | $v_d = 32.2$ |
| $r_4 = -6.7893$ | | | |
| | $d_4 = 0.07$ | | |
| $r_5 = 0.9556$ | | | |
| | $d_5 = 0.0959$ | $N_3 = 1.6660$ | $v_d = 47.9$ |
| $r_6 = 0.494$ | | | |
| | $d_6 = 0.3309$ | | |
| $r_7 = 1.1975$ | | | |
| | $d_7 = 0.05872$ | $N_4 = 1.72$ | $v_d = 50.3$ |
| $r_8 = 4.8112$ | | | |
| | $d_8 = 0.0560$ | | |
| $r_9 = 12.8403$ | | | |
| | $d_9 = 0.2003$ | $N_5 = 1.72$ | $v_d = 50.3$ |
| $r_{10} = -0.5629$ | | | |
| | $d_{10} = 0.1612$ | $N_6 = 1.5569$ | $v_d = 48.5$ |
| $r_{11} = -2.1787$ | | | |
| | $d_{11} = 0.1164$ | | |
| $r_{12} = -1.3579$ | | | |
| | $d_{12} = 0.1097$ | $N_7 = 1.62$ | $v_d = 36.3$ |
| $r_{13} = -0.8693$ | | | |
| | $d_{13} = 0.0861$ | | |
| $r_{14} = -0.7301$ | | | |
| | $d_{14} = 0.1064$ | $N_8 = 1.8051$ | $v_d = 25.4$ |
| $r_{15} = 2.3288$ | | | |
| | $d_{15} = 0.0855$ | | |
| $r_{16} = -1.427$ | | | |
| | $d_{16} = 0.1007$ | $N_9 = 1.757$ | $v_d = 47.9$ |
| $r_{17} = -0.7319$ | | | |
| | $d_{17} = 0.0067$ | | |
| $r_{18} = -3.6906$ | | | |
| | $d_{18} = 0.18$ | $N_{10} = 1.705$ | $v_d = 54.8$ |
| $r_{19} = -1.2175$ | | | |
| | $\Sigma d = 2.2811$. | | |

3. The objective lens of claim 1 including means for axially moving said intermediate lens group relative to and independent of the axial movement of said front and rear lens groups.

4. The objective lens of claim 3 wherein the front lens group includes four lenses, the intermediate lens group includes five lenses and the rear lens group includes one lens, the first, third, sixth and eigth lenses being negative and the second, fourth, fifth, seventh, ninth and 10th lenses being positive.

5. The objective lens of claim 4 wherein the fifth and sixth lenses form a doublet.

6. A retrofocus type objective lens system comprising:
a diaphragm;
a first pair of adjoining positive lenses with a first variable air space therebetween and disposed in front of said diaphragm;
a second pair of adjoining positive lenses with a second variable air spaced therebetween and disposed at the rearmost of the lens system, said first and second air spaces separating the lens system into front and intermediate lens groups and a rearmost lens;
means for moving said front lens group and said rearmost lens along the optical axis of the lens system while maintaining the relative distance therebetween constant; and
means for moving said intermediate lens group with the movement of said front lens group and said rearmost lens at a rate different from that of said front lens group and said rearmost lens, whereby the axial dimension of said first and second air spaces varies to compensate for the aggravation of aberration attendant to the change in focusing of said objective lens system.

7. A retrofocus type objective lens system as in claim 6 further comprising means for manually moving said intermediate lens group independently of said front lens group and said rearmost lens.

8. A retrofocus type objective lens system as set forth in claim 6, wherein said system consists of the following 10 lenses, said first air space being that defined between a fourth positive lens and a fifth positive lens, said second air space being that defined between a ninth positive lens and a tenth positive lens, relative aperture being F/2.0, angle of view being 72° and backfocus being 1.31f (F: focal length):

| radius of curvature | on-axial thickness | refractive index | Abbe's number |
|---|---|---|---|
| $r_1 = 3.7193$ | | | |
| | $d_1 = 0.0972$ | $N_1 = 1.6$ | $v_d = 64.1$ |
| $r_2 = 0.9414$ | | | |
| | $d_2 = 0.2754$ | | |
| $r_3 = 2.7507$ | | | |
| | $d_3 = 0.1441$ | $N_2 = 1.6727$ | $v_d = 32.2$ |
| $r_4 = -6.7893$ | | | |
| | $d_4 = 0.07$ | | |
| $r_5 = 0.9556$ | | | |
| | $d_5 = 0.0959$ | $N_3 = 1.6660$ | $v_d = 47.9$ |
| $r_6 = 0.494$ | | | |
| | $d_6 = 0.3309$ | | |
| $r_7 = 1.1975$ | | | |
| | $d_7 = 0.05872$ | $N_4 = 1.72$ | $v_d = 50.3$ |
| $r_8 = 4.8112$ | | | |
| | $d_8 = 0.0560$ | | |
| $r_9 = 12.8403$ | | | |
| | $d_9 = 0.2003$ | $N_5 = 1.72$ | $v_d = 50.3$ |
| $r_{10} = -0.5629$ | | | |
| | $d_{10} = 0.1612$ | $N_6 = 1.5569$ | $v_d = 48.5$ |
| $r_{11} = -2.1787$ | | | |
| | $d_{11} = 0.1164$ | | |
| $r_{12} = -1.3579$ | | | |
| | $d_{12} = 0.1097$ | $N_7 = 1.62$ | $v_d = 36.3$ |
| $r_{13} = -0.8693$ | | | |
| | $d_{13} = 0.0861$ | | |
| $r_{14} = -0.7301$ | | | |
| | $d_{14} = 0.1064$ | $N_8 = 1.8051$ | $v_d = 25.4$ |
| $r_{15} = 2.3288$ | | | |

-continued

| radius of curvature | on-axial thickness | refractive index | Abbe's number |
|---|---|---|---|
| $r_{16}=-1.427$ | $d_{15}=0.0855$ | | |
| $r_{17}=-0.7319$ | $d_{16}=0.1007$ | $N_9=1.757$ | $v_d=47.9$ |

-continued

| radius of curvature | on-axial thickness | refractive index | Abbe's number |
|---|---|---|---|
| $r_{18}=3.6906$ | $d_{17}=0.0067$ | | |
| $r_{19}=-1.2175$ | $d_{18}=0.18$ | $N_{10}=1.705$ | $v_d=54.8$ |
| | $\Sigma d=2.2811.$ | | |

\* \* \* \* \*